US012678829B2

(12) United States Patent
Lan et al.

(10) Patent No.: US 12,678,829 B2
(45) Date of Patent: Jul. 14, 2026

(54) BEVERAGE BOTTLE SORTING MECHANISM AND SORTING AND RECYCLING DEVICE

(71) Applicant: Tomra Recycling Technology (Xiamen) Co., Ltd., Xiamen (CN)

(72) Inventors: Chenlong Lan, Xiamen (CN); Yongyang Zhu, Xiamen (CN); Shanshan Zhu, Xiamen (CN)

(73) Assignee: Tomra Recyling Technology (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 19/024,041

(22) Filed: Jan. 16, 2025

(65) Prior Publication Data

US 2026/0027589 A1 Jan. 29, 2026

(30) Foreign Application Priority Data

Jul. 29, 2024 (CN) ......................... 202421799704.5

(51) Int. Cl.
*B07C 5/36* (2006.01)
*B07C 5/38* (2006.01)

(52) U.S. Cl.
CPC ................ *B07C 5/362* (2013.01); *B07C 5/38* (2013.01); *B07C 2501/0045* (2013.01)

(58) Field of Classification Search
CPC .................. B07C 5/3408; B07C 5/362; B07C 2501/0045; B65F 2001/008
USPC ......................................... 209/606, 523, 657
See application file for complete search history.

(56) References Cited

U.S. PATENT DOCUMENTS 8,322,641 B2 * 12/2012 Jeon .................... B02C 19/0093 209/4
11,173,522 B2 * 11/2021 Martinsen ............. G07F 11/007

FOREIGN PATENT DOCUMENTS

CN 218866545 U 4/2023

OTHER PUBLICATIONS

Huang; Yao-bin; "A Beverage Bottle Sorting Device" (English Translation), Apr. 14, 2023, worldwide.espacenet.com (Year: 2023).*

* cited by examiner

*Primary Examiner* — Molly K Devine
(74) *Attorney, Agent, or Firm* — Nitin Kaushik

(57) ABSTRACT

A beverage bottle sorting mechanism and a sorting and recycling device are provided. The beverage bottle sorting mechanism includes a frame and further includes a first sorting member and a second sorting member mounted side by side on the frame, a driving member is further provided on the frame, and the driving member is connected to the first sorting member and the second sorting member by transmission for driving the first and second sorting members to rotate and execute first, second, and third sorting stations. Compared to a conventional sorting mechanism that can shift materials in only two directions for sorting using a single sorting plate, the utility model can adjust three sorting stations, achieve three sorting positions in the middle and on the left and right sides of two sorting members, and shift three types of beverage bottles to different positions according to recognition results of the previous process.

14 Claims, 12 Drawing Sheets

A B

BEVERAGE BOTTLE SORTING MECHANISM AND SORTING AND RECYCLING DEVICE

TECHNICAL FIELD

The utility model relates to the technical field of beverage bottle recycling devices, in particular to a beverage bottle sorting mechanism and a sorting and recycling device.

BACKGROUND

Sorting mechanisms are widely used in beverage bottle recycling devices to sort materials of beverage bottles (cans, plastic bottles, glass bottles, etc.) transported from a recognition chamber and guide the beverage bottles into different recycling bins, so as to achieve material classification of the beverage bottles. At present, the commonly used sorting mechanisms on the market can simultaneously sort only two types of beverage bottles, but cannot simultaneously sort three types of beverage bottles. To solve the above problem, 2 or 3 beverage bottle recycling devices are usually required to simultaneously recycle different types of beverage bottles. This leads to higher investment costs of recycling devices.

SUMMARY

To solve the above problem, the objective of the utility model is to provide a beverage bottle sorting mechanism and a sorting and recycling device.

The utility model is implemented as follows:

A beverage bottle sorting mechanism includes a frame, a first sorting member, and a second sorting member, where the first sorting member and the second sorting member are mounted side by side on the frame, a driving member is further provided on the frame, and the driving member is connected to the first sorting member and the second sorting member by transmission respectively for driving the first sorting member and the second sorting member to rotate and execute a first sorting station, a second sorting station, and a third sorting station.

Preferably, the first sorting member includes a first rotating shaft and a first sorting guide plate, the second sorting member includes a second rotating shaft and a second sorting guide plate, the first rotating shaft and the second rotating shaft are spaced apart and rotatably mounted in the frame, the first sorting guide plate is fixedly connected to the first rotating shaft, and the second sorting guide plate is fixedly connected to the second rotating shaft; the first rotating shaft and the second rotating shaft are connected to the driving member by transmission.

Preferably, an access door is provided on an inlet side of the first sorting guide plate on the surface opposite to the second sorting guide plate; or an access door is provided on an inlet side of the second sorting guide plate on the surface opposite to the first sorting guide plate.

Preferably, when the access door is provided on the first sorting guide plate, a reinforcing plate is connected between the first rotating shaft and the side of the access door near the second sorting guide plate; or when the access door is provided on the second sorting guide plate, a reinforcing plate is connected between the second rotating shaft and the side of the access door near the first sorting guide plate.

Preferably, a first directing plate inclined downwards is provided at the bottom of the first sorting guide plate on the side away from the second sorting guide plate; and a second directing plate inclined downwards is provided at the bottom of the side of the second sorting guide plate on the side away from the first sorting guide plate.

Preferably, the frame includes a mounting plate, the bottom surface of the mounting plate is rotatably mounted with the first rotating shaft and the second rotating shaft, and the top surface of the mounting plate is mounted with the driving member; the driving member includes a first driving motor and a second driving motor, the first driving motor is connected to the first rotating shaft by transmission, and the second driving motor is connected to the second rotating shaft by transmission.

Preferably, a detection assembly is provided on the frame, the detection assembly includes a first detector on the frame for detecting the first sorting station, the second sorting station, and the third sorting station of the first sorting member, and the detection assembly further includes a second detector on the frame for detecting the first sorting station, the second sorting station, and the third sorting station of the second sorting member.

Preferably, the first detector includes a first proximity sensor, a second proximity sensor, and a third proximity sensor; the second detector includes a fourth proximity sensor, a fifth proximity sensor, and a sixth proximity sensor; the first sorting member is provided with a first sensing plate, and the second sorting member is provided with a second sensing plate; the first proximity sensor, the second proximity sensor, and the third proximity sensor are arranged on the movement trajectory of the first sensing plate; and the fourth proximity sensor, the fifth proximity sensor, and the sixth proximity sensor are arranged on the movement trajectory of the second sensing plate.

Preferably, the first detector includes a first proximity sensor and a second proximity sensor; the second detector includes a third proximity sensor and a fourth proximity sensor; the first sorting member is provided with a first sensing plate and a second sensing plate, and the first proximity sensor and the second proximity sensor are located on the movement trajectory of the first sensing plate and the second sensing plate; the second sorting member is provided with a third sensing plate and a fourth sensing plate, and the third proximity sensor and the fourth proximity sensor are located on the movement trajectory of the third sensing plate and the fourth sensing plate; in an initial state, the first sensing plate is opposite to the first proximity sensor, the second sensing plate is opposite to the second proximity sensor, the third sensing plate is opposite to the third proximity sensor, and the fourth sensing plate is opposite to the fourth proximity sensor.

A sorting and recycling device includes a recognition chamber, three recycling bins, and a conveying mechanism; the conveying mechanism is arranged in the recognition chamber; the sorting and recycling device further includes the beverage bottle sorting mechanism described in any one of the above, an infeed side of the beverage bottle sorting mechanism is connected to an outlet side of the conveying mechanism, and a discharge side of the beverage bottle sorting mechanism is connected to the three recycling bins.

Beneficial effects of the utility model are as follows:

The utility model provides a beverage bottle sorting mechanism, which has at least the following technical effects compared to existing technologies: 1. By mounting the first sorting member and the second sorting member in the frame, compared to a conventional sorting mechanism that can shift materials in only two directions for sorting using a single sorting plate, the utility model can adjust three sorting stations, achieve three sorting positions in the middle, on the left side, and on the right side of the two sorting members, and shift three types of beverage bottles to different positions according to the recognition results of the previous process, that is, one sorting mechanism can sort three types of beverage bottles. 2. Providing the access door on one of the sorting guide plates can provide protection on the one hand. For example, a compactor of a sorting device mounted with the beverage bottle sorting mechanism produces splashing fragments when crushing beverage bottles, and the presence of the access door can prevent the fragments from splashing out to injure users. On the other hand, the access door can also prevent some improper operations by users. 3. The directing plates are provided at the bottoms of the first sorting guide plate and the second sorting guide plate on the sides opposite to each other, which can direct the sliding of a beverage bottle and prevent the beverage bottle from falling vertically into the space below the middle station, so as to ensure that the sorted beverage bottle accurately falls into the corresponding recycling bin. 4. The detectors are provided to detect the positions of the first sorting member and the second sorting member, which can ensure that the driving member drives the first sorting member and the second sorting member to accurately move to the corresponding sorting positions, thereby accurately guiding beverage bottles of three materials into the corresponding recycling bins.

The utility model provides a sorting and recycling device, which has at least the following technical effects compared to existing technologies: the above-mentioned beverage bottle sorting mechanism can achieve classification and recycling of beverage bottles of three materials by one device, which can effectively reduce the device procurement costs of recycling enterprises.

Figure 1:
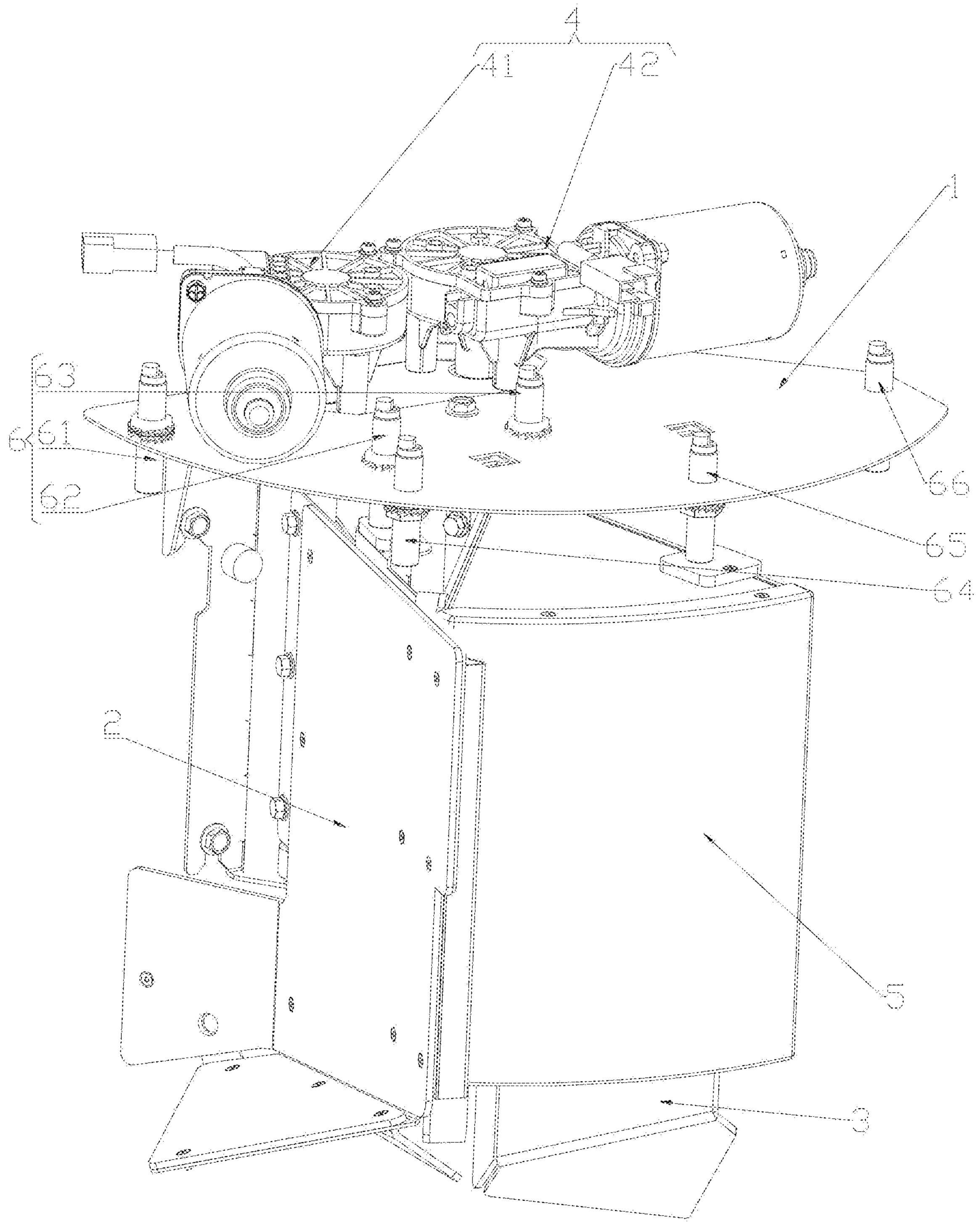
FIG. 1 is a schematic structural diagram of a beverage bottle sorting mechanism in Embodiment 1 of the utility model in an initial state.
Figure 2:
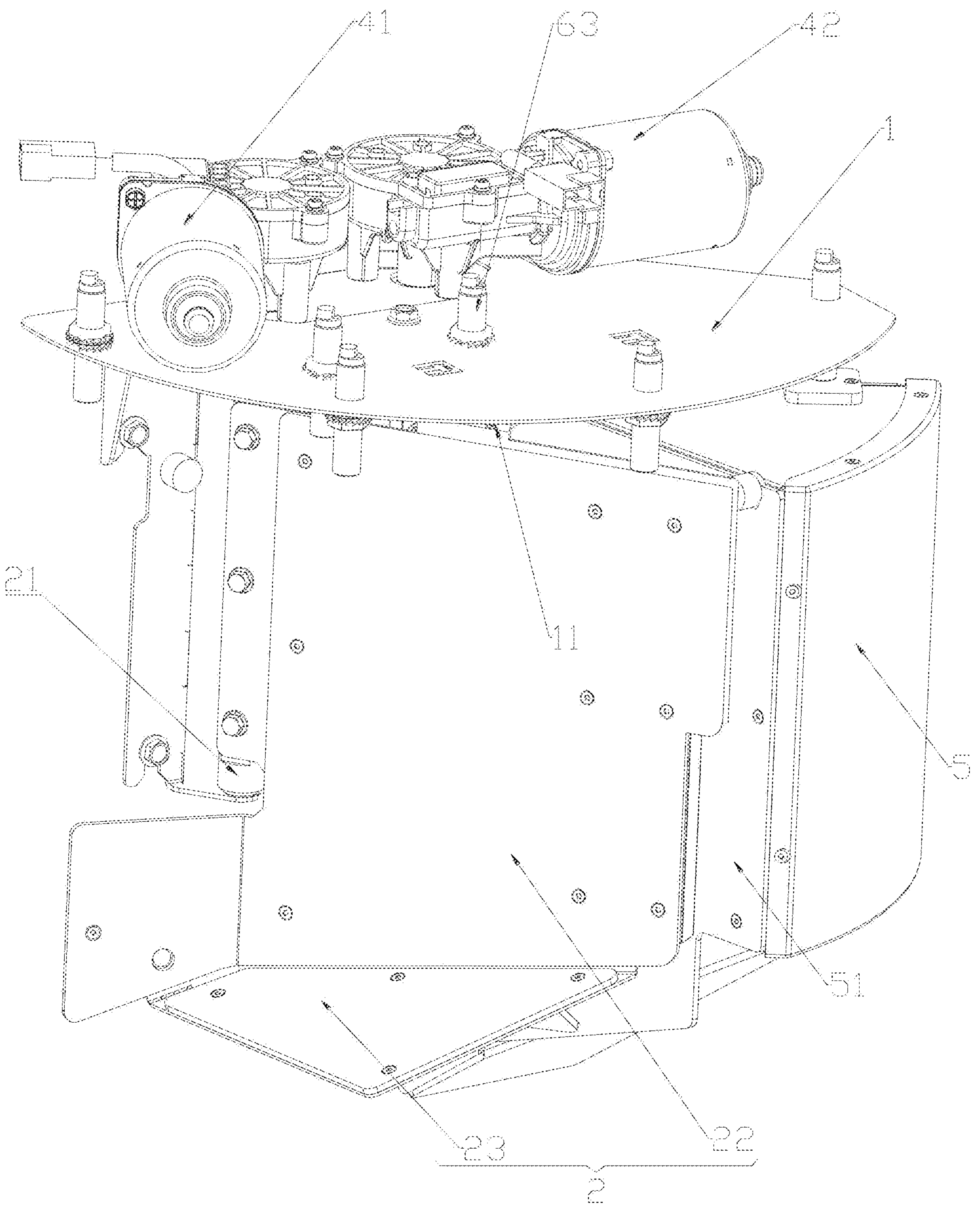
FIG. 2 is a schematic diagram of the beverage bottle sorting mechanism in Embodiment 1 of the utility model in a state of sorting to the left.
Figure 3:
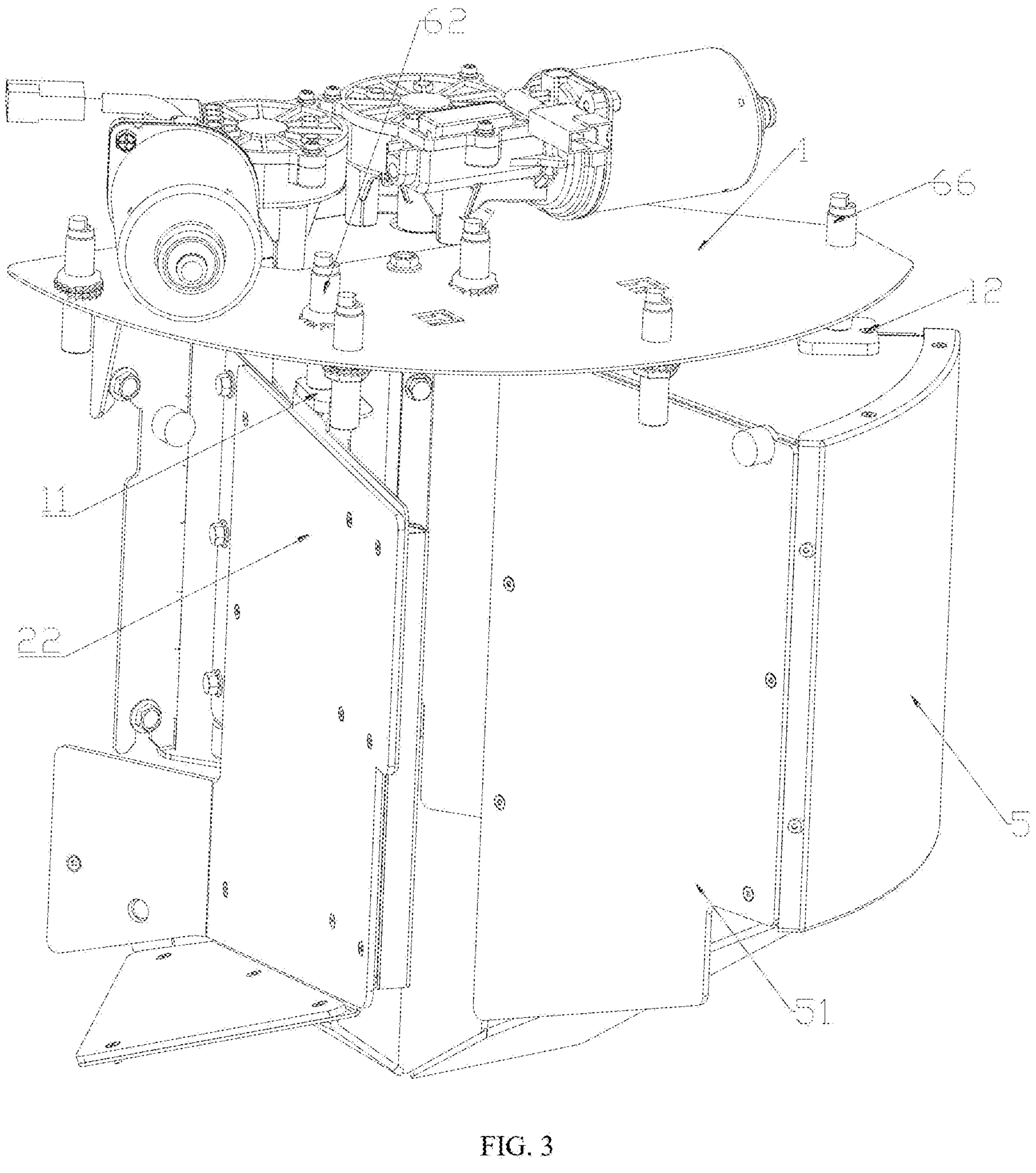
FIG. 3 is a schematic diagram of the beverage bottle sorting mechanism in Embodiment 1 of the utility model in a state of sorting to the middle.
Figure 4:
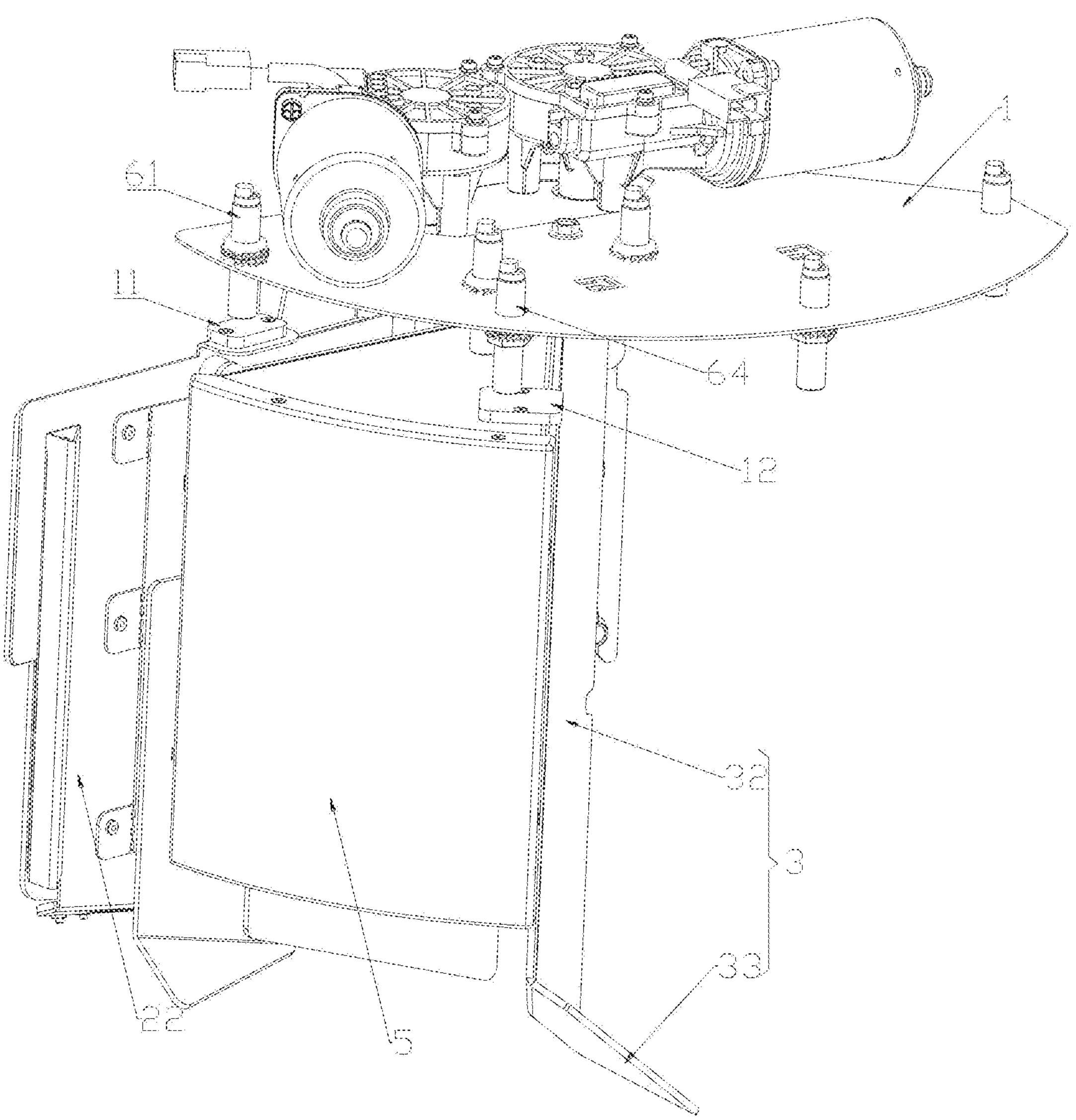
FIG. 4 is a schematic diagram of the beverage bottle sorting mechanism in Embodiment 1 of the utility model in a state of sorting to the right.
Figure 5:
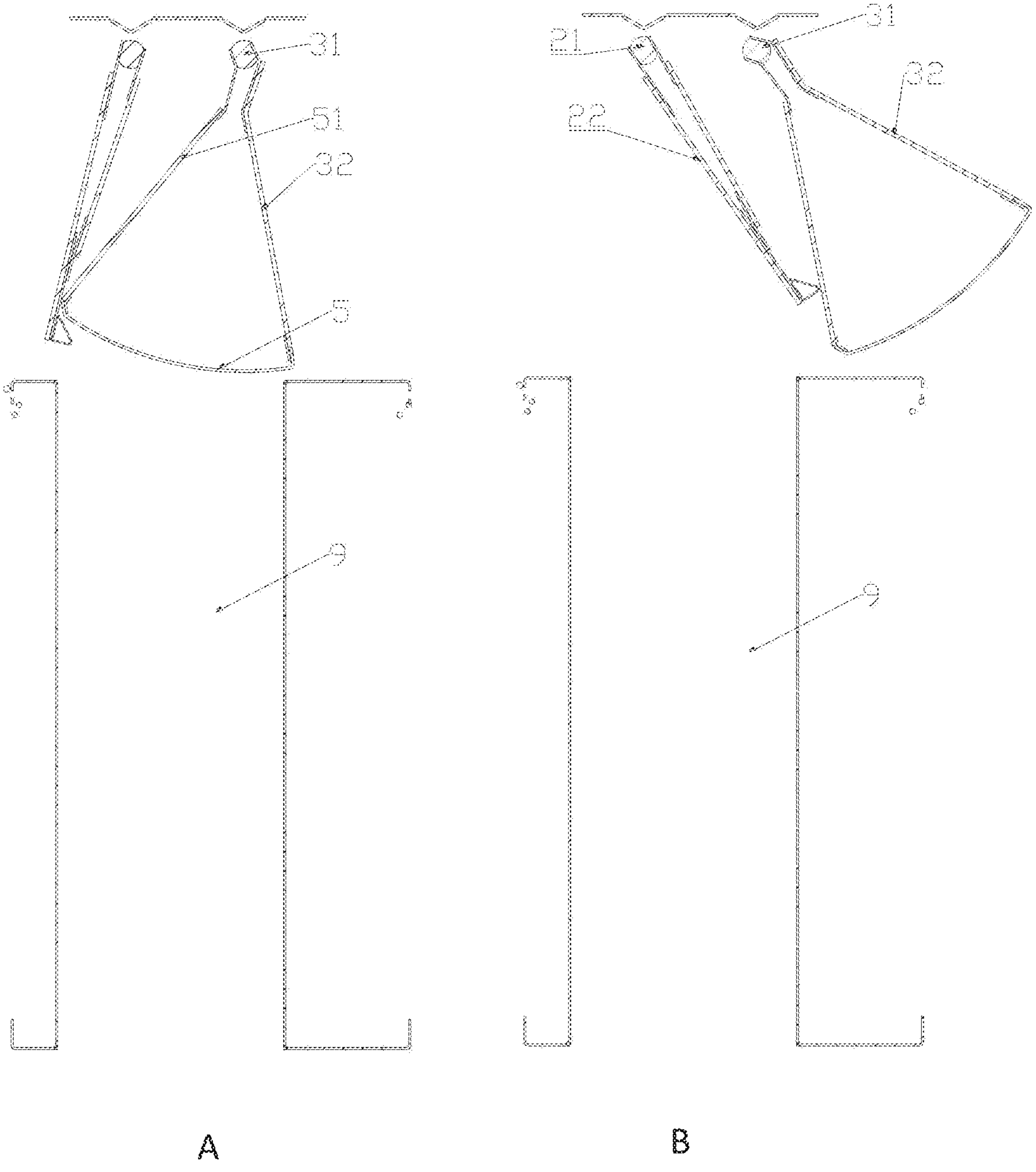
FIG. 5A is a cross-sectional view of a beverage bottle sorting mechanism in Embodiment 1 or 2 of the utility model in an initial state.
FIG. 5B is a cross-sectional view of the beverage bottle sorting mechanism in Embodiment 1 or 2 of the utility model in a state of sorting to a left recycling bin.
Figure 6:
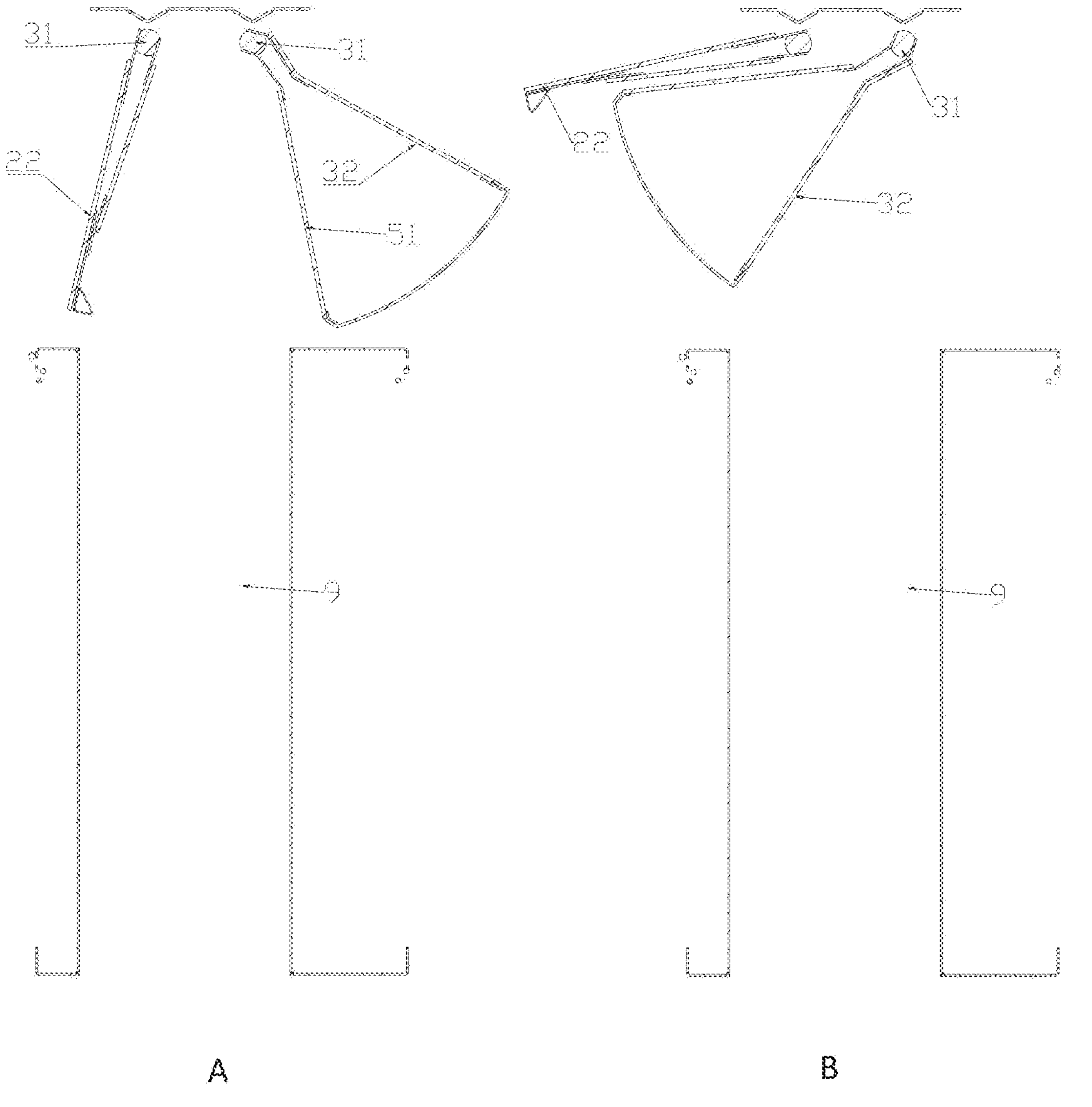
FIG. 6A is a cross-sectional view of the beverage bottle sorting mechanism in Embodiment 1 or 2 of the utility model in a state of sorting to a middle recycling bin.
FIG. 6B is a cross-sectional view of the beverage bottle sorting mechanism in Embodiment 1 or 2 of the utility model in a state of sorting to a right recycling bin.
Figure 7:
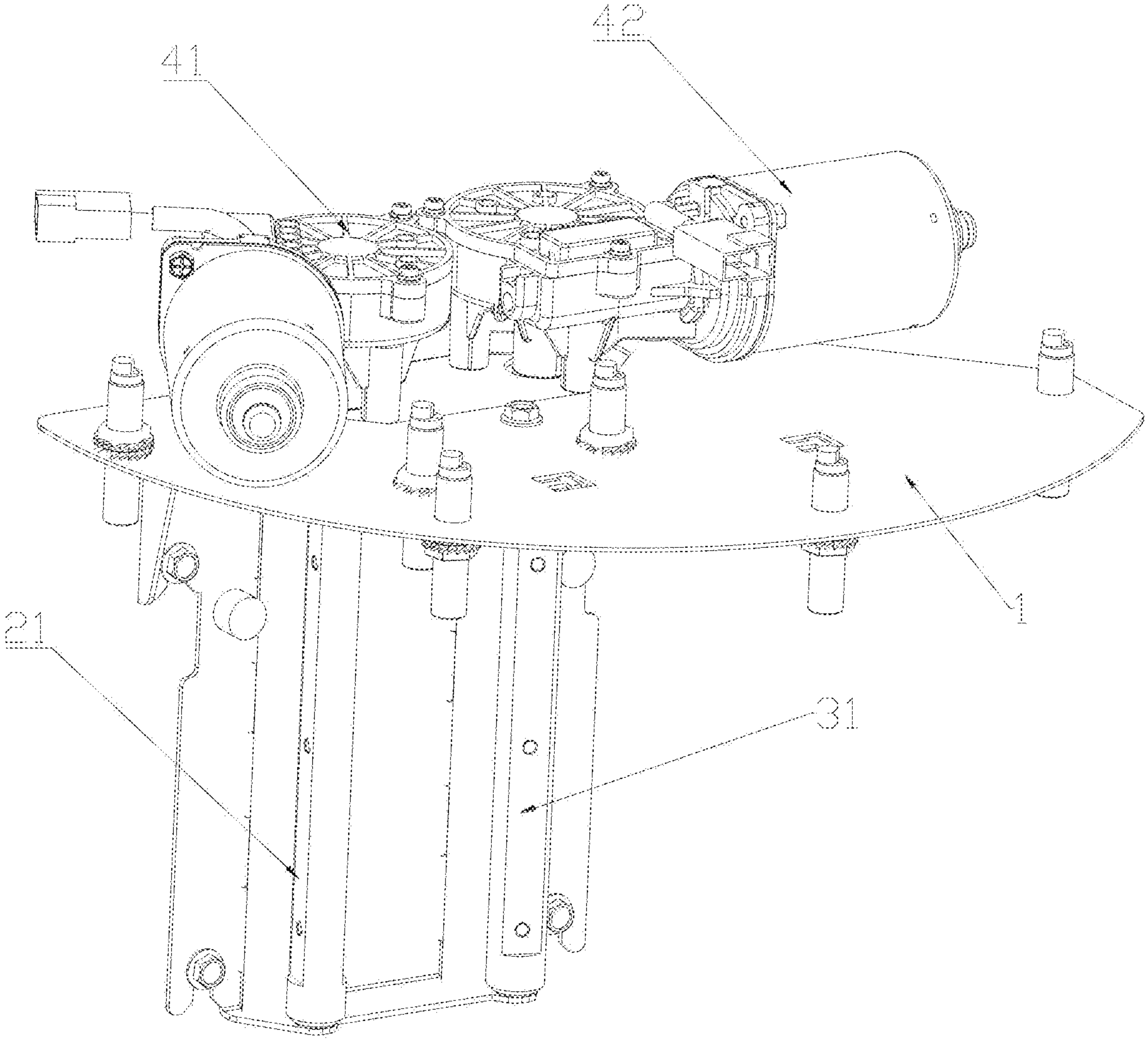
FIG. 7 is a schematic diagram of connection of a frame with a first rotating shaft and a second rotating shaft of the beverage bottle sorting mechanism in Embodiment 1 of the utility model.
Figure 8:
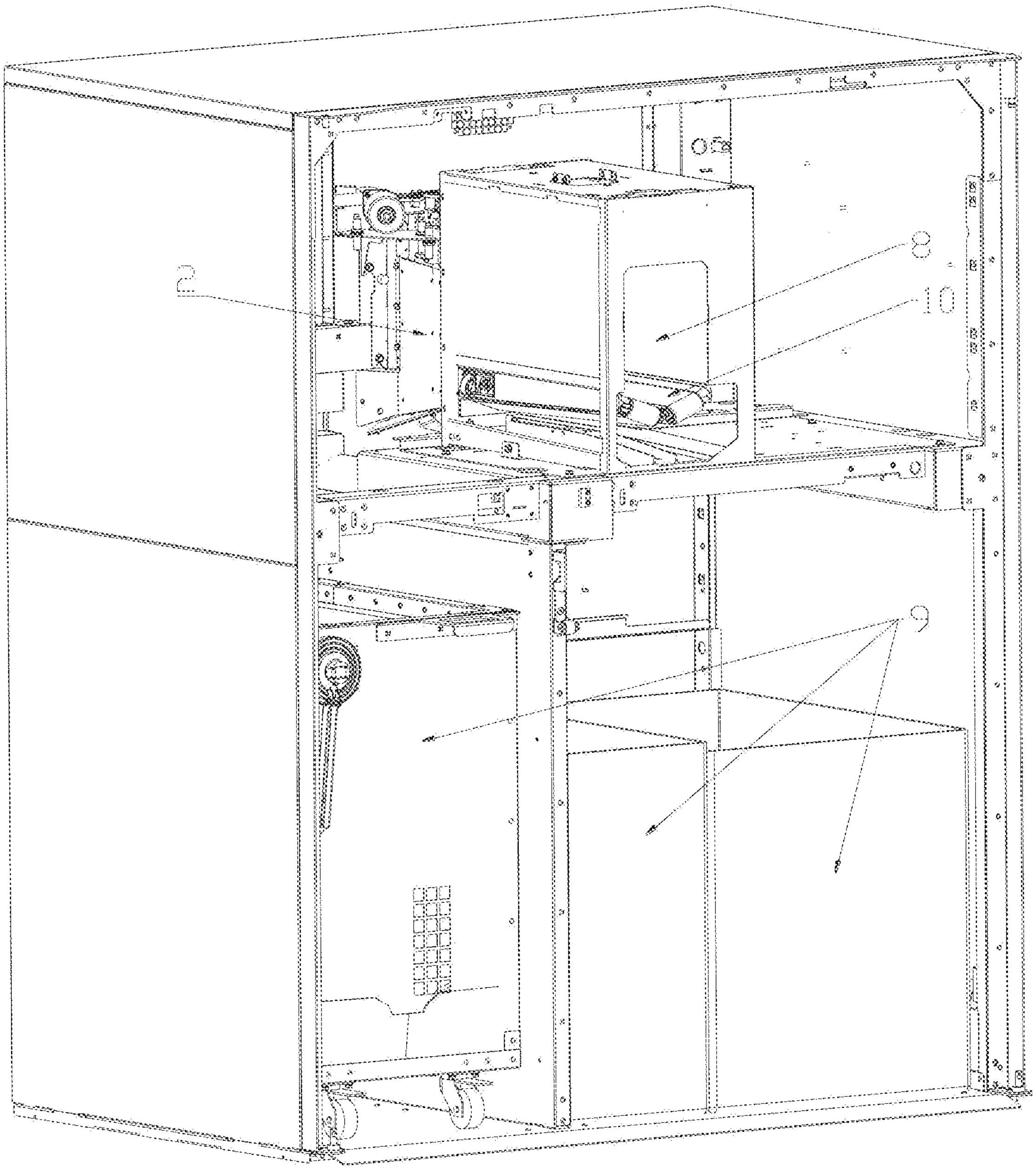
FIG. 8 is a structural view of a sorting and recycling device of the utility model.

Explanation of reference numerals: 1. Frame; 2. First sorting member; 21. First rotating shaft; 22. First sorting guide plate; 23. First directing plate; 3. Second sorting member; 31. Second rotating shaft; 32. Second sorting guide plate; 33. Second directing plate; 4. Driving member; 41. First driving motor; 42. Second driving motor; 5. Access door; 51. Reinforcing plate; 6. Detection assembly; 61. First proximity sensor; 62. Second proximity sensor; 63. Third proximity sensor; 64. Fourth proximity sensor; 65. Fifth proximity sensor; 66. Sixth proximity sensor; 8. Recognition chamber; 9. Recycling bin; 10. Conveying mechanism; 11. First sensing plate; 12. Second sensing plate; 13. Third sensing plate; 14. Fourth sensing plate.

DETAILED DESCRIPTION

The utility model will be further explained in conjunction with the accompanying drawings and specific embodiments.

Embodiment 1

With reference to FIGS. 1 to 7, a beverage bottle sorting mechanism includes a frame 1, a first sorting member 2, and a second sorting member 3, where the first sorting member 2 and the second sorting member 3 are mounted side by side on the frame 1, a driving member 4 is further provided on the frame 1, and the driving member 4 is connected to the first sorting member 2 and the second sorting member 3 by transmission respectively for driving the first sorting member 2 and the second sorting member 3 to rotate and execute a first sorting station, a second sorting station, and a third sorting station. By mounting the first sorting member 2 and the second sorting member 3 in the frame 1, compared to a conventional sorting mechanism that can shift materials in only two directions for sorting using a single sorting plate, the utility model can adjust three sorting stations, achieve three sorting positions in the middle, on the left side, and on the right side of the two sorting members, and shift three types of beverage bottles to different positions according to the recognition results of the previous process, that is, one sorting mechanism can sort three types of beverage bottles.

With reference to FIGS. 1 to 7, preferably, the first sorting member 2 includes a first rotating shaft 21 and a first sorting guide plate 22, the second sorting member 3 includes a second rotating shaft 31 and a second sorting guide plate 32, the first rotating shaft 21 and the second rotating shaft 31 are spaced apart and rotatably mounted in the frame 1, the first sorting guide plate 22 is fixedly connected to the first rotating shaft 21, and the second sorting guide plate 32 is fixedly connected to the second rotating shaft 31; the first rotating shaft 21 and the second rotating shaft 31 are connected to the driving member 4 by transmission. Through three station stopping positions of the first sorting guide plate and three station stopping positions of the second sorting guide plate, the cooperation of the two can sort beverage bottles at three stations and push three types of beverage bottles into three recycling bins 9 respectively.

With reference to FIGS. 1 to 6, preferably, an access door 5 is provided on an inlet side of the first sorting guide plate 22 on the surface opposite to the second sorting guide plate 32; or an access door 5 is provided on an inlet side of the second sorting guide plate 32 on the surface opposite to the first sorting guide plate 22. Providing the access door 5 on one of the sorting guide plates can provide protection on the one hand. For example, a compactor of a sorting device mounted with the beverage bottle sorting mechanism produces splashing fragments when crushing beverage bottles, and the presence of the access door 5 can prevent the fragments from splashing out to injure users. On the other hand, the access door 5 can also prevent some improper operations by users.

With reference to FIGS. 1 to 6, preferably, when the access door 5 is provided on the first sorting guide plate 22, a reinforcing plate 51 is connected between the first rotating shaft 21 and the side of the access door 5 near the second sorting guide plate 32; or when the access door 5 is provided on the second sorting guide plate 32, a reinforcing plate 51 is connected between the second rotating shaft 31 and the side of the access door 5 near the first sorting guide plate 22. Therefore, the structural strength of the access door 5 is increased.

With reference to FIGS. 1 to 4, preferably, a first directing plate 23 inclined downwards is provided at the bottom of the first sorting guide plate 22 on the side away from the second sorting guide plate 32; and a second directing plate 33 inclined downwards is provided at the bottom of the side of the second sorting guide plate 32 on the side away from the first sorting guide plate. The directing plates are provided at the bottoms of the first sorting guide plate and the second sorting guide plate on the sides opposite to each other, which can direct the sliding of a beverage bottle and prevent the beverage bottle from falling vertically into the space below the middle station, so as to ensure that the sorted beverage bottle accurately falls into the corresponding recycling bin 9.

With reference to FIGS. 1 to 7, preferably, the frame 1 includes a mounting plate, the bottom surface of the mounting plate is rotatably mounted with the first rotating shaft 21 and the second rotating shaft 31, and the top surface of the mounting plate is mounted with the driving member 4; the driving member 4 includes a first driving motor 41 and a second driving motor 42, the first driving motor 41 is connected to the first rotating shaft 21 by transmission, and the second driving motor 42 is connected to the second rotating shaft 31 by transmission. Therefore, it is easy to mount and arrange the driving member 4, the first rotating shaft 21, the second rotating shaft 31, etc.

With reference to FIGS. 1 to 7, preferably, a baffle is provided on the bottom surface of the mounting plate on the side away from an infeed port, and the first rotating shaft 21 and the second rotating shaft 31 are located in front of the baffle facing an infeed direction. The baffle plays a role in increasing the structural strength.

With reference to FIGS. 1 to 4, preferably, a detection assembly 6 is provided on the frame 1, the detection assembly 6 includes a first detector on the frame 1 for detecting the first sorting station, the second sorting station, and the third sorting station of the first sorting member 2, and the detection assembly 6 further includes a second detector on the frame 1 for detecting the first sorting station, the second sorting station, and the third sorting station of the second sorting member 3. The first detector includes a first proximity sensor 61, a second proximity sensor 62, and a third proximity sensor 63; the second detector includes a fourth proximity sensor 64, a fifth proximity sensor 65, and a sixth proximity sensor 66; the first sorting member 2 is provided with a first sensing plate 11, and the second sorting member 3 is provided with a second sensing plate 12; the first proximity sensor 61, the second proximity sensor 62, and the third proximity sensor 63 are arranged on the movement trajectory of the first sensing plate 11; and the fourth proximity sensor 64, the fifth proximity sensor 65, and the sixth proximity sensor 66 are arranged on the movement trajectory of the second sensing plate 12. The detectors are provided to detect the positions of the first sorting member 2 and the second sorting member 3, which can ensure that the driving member 4 drives the first sorting member 2 and the second sorting member 3 to accurately move to the corresponding sorting positions, thereby accurately guiding beverage bottles of three materials into the corresponding recycling bins 9.

With reference to FIGS. 1 to 8, a sorting and recycling device includes a recognition chamber 8, three recycling bins 9, a conveying mechanism 10, and a compactor. The conveying mechanism 10 is arranged in the recognition chamber 8. The sorting and recycling device further includes the beverage bottle sorting mechanism as described in any one of the above. An infeed side of the beverage bottle sorting mechanism is connected to an outlet side of the conveying mechanism 10, and a discharge side of the beverage bottle sorting mechanism is connected to the three recycling bins 9. The recognition chamber 8 recognizes the material of a beverage bottle fed by the conveying mechanism 10.

The utility model has the following working principle:

After the beverage bottle is recognized in the recognition chamber 8, the conveying mechanism 10 conveys the beverage bottle to the rear end of the recycling device, and at the same time, the sorting mechanism also starts working synchronously:

If the beverage bottle is recognized as a glass bottle, the first sorting guide plate 22 synchronously turns from the position of the second proximity sensor 62 (initial position) to the position of the third proximity sensor 63 under the drive of the first rotating shaft 21; meanwhile, the second sorting guide plate 32 and the access door 5 synchronously turn from the position of the fifth proximity sensor 65 (initial position) to the position of the sixth proximity sensor 66 under the drive of the second rotating shaft 31; then the glass bottle is conveyed into the recycling bin 9 on the left side; after the sorting is completed, the first sorting guide plate 22, the second sorting guide plate 32, and the access door 5 synchronously return to the positions close to the second proximity sensor 62 and the fifth proximity sensor 65 under the drive of the first rotating shaft 21 and the second rotating shaft 31 respectively;

If the beverage bottle is recognized as a can, the second sorting guide plate 32 and the access door 5 synchronously turn from the position of the fifth proximity sensor 65 (initial position) to the position of the sixth proximity sensor 66 under the drive of the second rotating shaft 31; meanwhile, the first sorting guide plate 22 remains at the position of the second proximity sensor 62 (initial position); then the can is conveyed into the middle recycling bin 9; after the sorting is completed, the second sorting guide plate 32 and the access door 5 return to the position of the fifth proximity sensor 65 under the drive of the second rotating shaft 31;

If the beverage bottle is recognized as a plastic bottle, the first sorting guide plate 22 synchronously turns from the position of the second proximity sensor 62 (initial position) to the position of the first proximity sensor 61 under the drive of the first rotating shaft 21; meanwhile, the second sorting guide plate 32 and the access door 5 synchronously turn from the position of the fifth proximity sensor 65 (initial position) to the position of the fourth proximity sensor 64 under the drive of the second rotating shaft 31; then the plastic bottle is conveyed into the recycling bin 9 on the right side; after the sorting is completed, the first sorting guide plate 22, the second sorting guide plate 32, and the access door 5 synchronously return to the positions close to the second proximity sensor 62 and the fifth proximity sensor 65 under the drive of the first rotating shaft 21 and the second rotating shaft 31 respectively.

Embodiment 2

Figure 9:
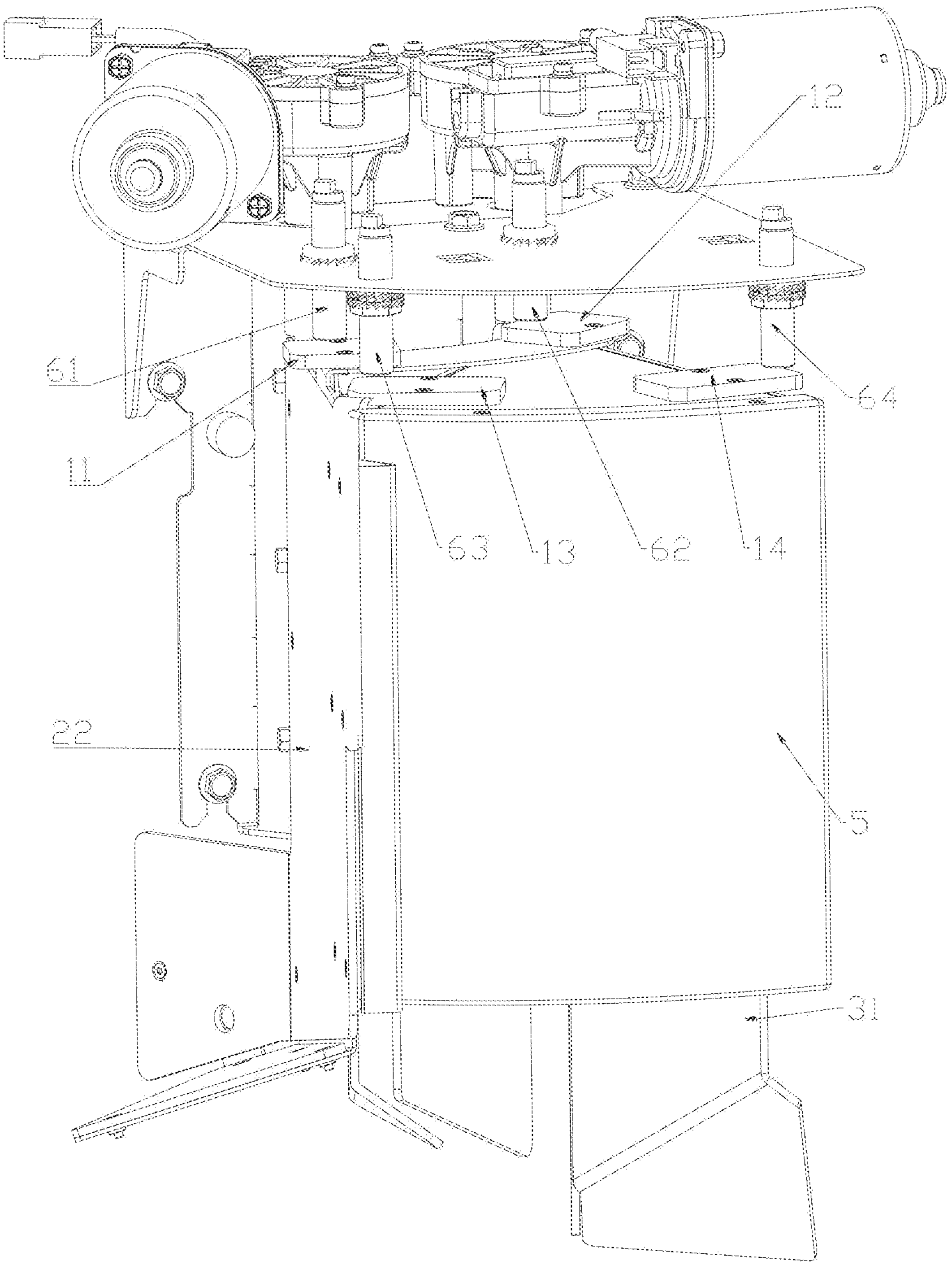
FIG. 9 is a schematic structural diagram of a beverage bottle sorting mechanism in Embodiment 2 of the utility model in an initial state.
Figure 10:
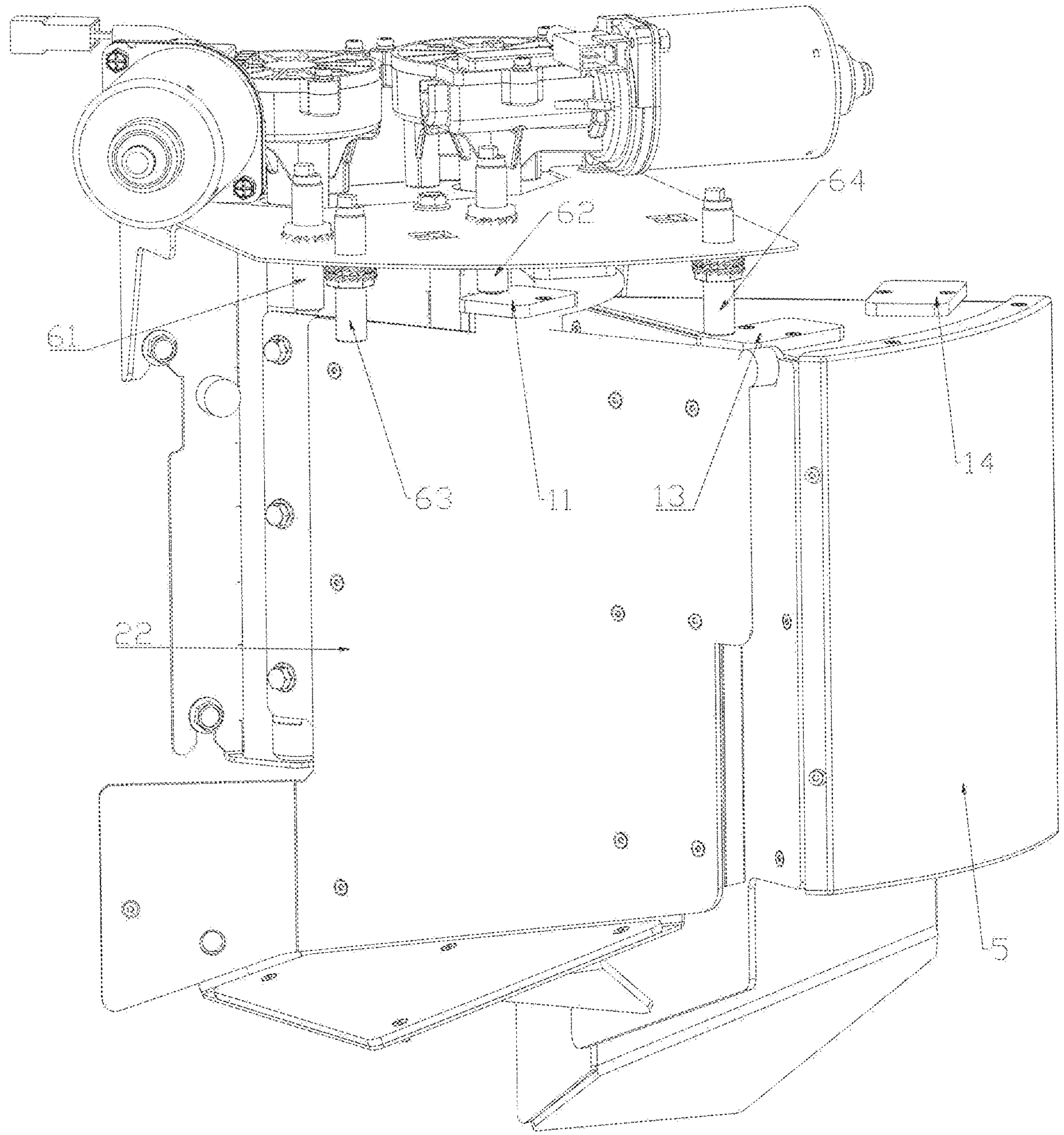
FIG. 10 is a schematic diagram of the beverage bottle sorting mechanism in Embodiment 2 of the utility model in a state of sorting to the left.
Figure 11:
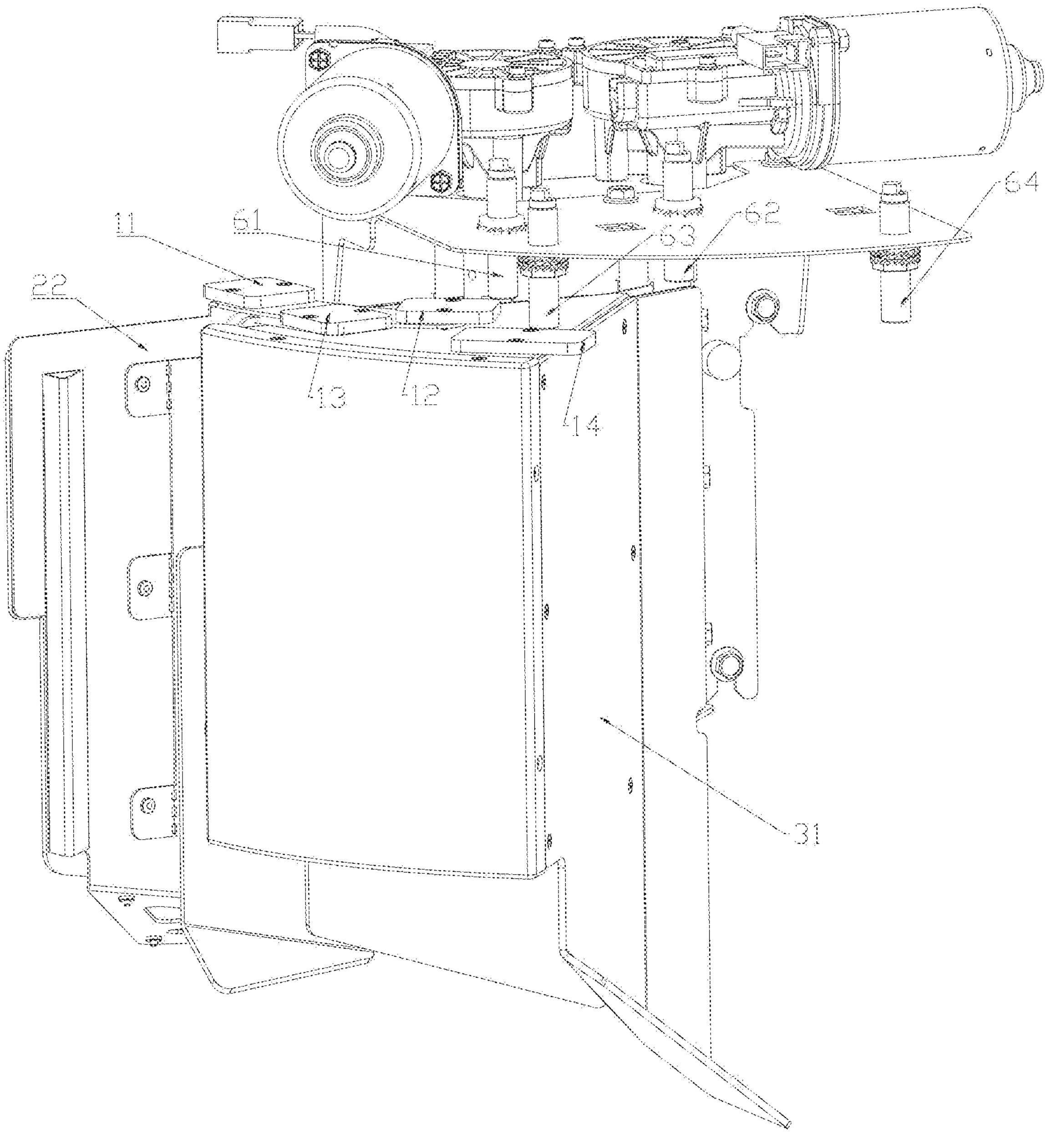
FIG. 11 is a schematic diagram of the beverage bottle sorting mechanism in Embodiment 2 of the utility model in a state of sorting to the right.
Figure 12:
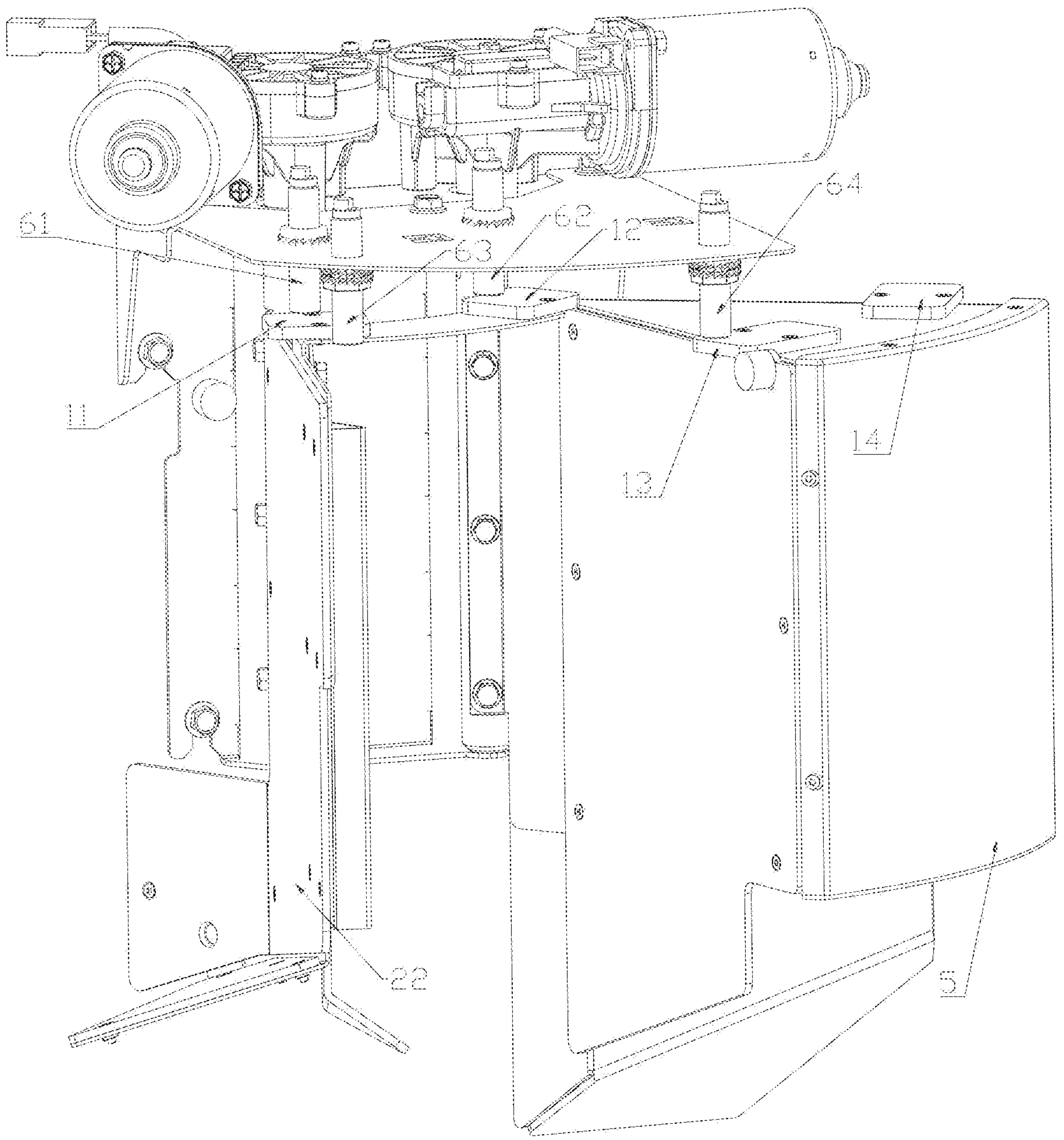
FIG. 12 is a schematic diagram of the beverage bottle sorting mechanism in Embodiment 2 of the utility model in a state of sorting to the middle.

With reference to FIGS. 9 to 12, Embodiment 2 differs from Embodiment 1 in that the first detector includes a first proximity sensor 61 and a second proximity sensor 62; the second detector includes a third proximity sensor 63 and a fourth proximity sensor 64; the first sorting member 2 is provided with a first sensing plate 11 and a second sensing plate 12, and the first proximity sensor 61 and the second proximity sensor 62 are located on the movement trajectory of the first sensing plate 11 and the second sensing plate 12; the second sorting member 3 is provided with a third sensing plate 13 and a fourth sensing plate 14, and the third proximity sensor 63 and the fourth proximity sensor 64 are located on the movement trajectory of the third sensing plate 13 and the fourth sensing plate 14; as shown in FIG. 9, in an initial state, the first sensing plate 11 is opposite to the first proximity sensor 61, the second sensing plate 12 is opposite to the second proximity sensor 62, the third sensing plate 13 is opposite to the third proximity sensor 63, the fourth sensing plate 14 is opposite to the fourth proximity sensor 64, the access door 5 blocks the conveying mechanism 10, and the beverage bottle cannot enter; as shown in FIG. 10, the second proximity sensor 62 detects the first sensing plate 11, the fourth proximity sensor 64 detects the third sensing plate 13, the first proximity sensor 61 and the third proximity sensor 63 do not detect any sensing plate, and the beverage bottle is guided into the left recycling bin 9; as shown in FIG. 11, the first proximity sensor 61 detects the second sensing plate 12, the third proximity sensor 63 detects the fourth sensing plate 14, the second proximity sensor 62 and the fourth proximity sensor 64 do not detect any sensing plate, and the beverage bottle is guided into the right recycling bin 9; as shown in FIG. 12, the first proximity sensor 61 detects the first sensing plate 11, the second proximity sensor 62 detects the second sensing plate 12, the fourth proximity sensor 64 detects the third sensing plate 13, the third proximity sensor 63 does not detect any sensing plate, and the beverage bottle is guided into the middle recycling bin 9.

With reference to FIGS. 8 to 12, a sorting and recycling device includes a recognition chamber 8, three recycling bins 9, a conveying mechanism 10, and a compactor. The conveying mechanism 10 is arranged in the recognition chamber 8. The sorting and recycling device further includes the beverage bottle sorting mechanism as described in Embodiment 2. An infeed side of the beverage bottle sorting mechanism is connected to an outlet side of the conveying mechanism 10, and a discharge side of the beverage bottle sorting mechanism is connected to the three recycling bins 9. The recognition chamber 8 recognizes the material of a beverage bottle fed by the conveying mechanism 10.

The following should be noted: First, in the description of the present application, unless otherwise specified and defined, the terms "mounted", "connected", and "connection" should be understood in a broad sense, for example, the "connection" may be mechanical or electrical connection, internal communication between two components, or direct connection; the terms "up", "down", "left", "right", etc. are only used for indicating relative positional relationships; and when the absolute position of a described object changes, the relative positional relationship may change.

Second, in the accompanying drawings of the disclosed embodiments of the utility model, only the structures related to the disclosed embodiments are mentioned, and other structures can refer to the usual design; and the same embodiment and different embodiments of the utility model can be combined with each other on a non-conflict basis.

Finally, described above are only the preferred embodiments of the utility model, the scope of protection of the utility model is not limited to the above embodiments, and any technical solution under the concept of the utility model falls within the scope of protection of the utility model.

It should be pointed out that, for those of ordinary skill in the art, many improvements and modifications can be made without departing from the principle of the utility model, and these improvements and modifications should also be considered within the scope of protection of the utility model.

What is claimed is:

1. A beverage bottle sorting mechanism, comprising a frame, a first sorting member, and a second sorting member, wherein the first sorting member and the second sorting member are mounted side by side on the frame, a driving member is further provided on the frame, and the driving member is connected to the first sorting member and the second sorting member by transmission respectively for driving the first sorting member and the second sorting member to rotate to a first sorting position, a second sorting position, and a third sorting position;

wherein a detection assembly is provided on the frame, the detection assembly comprises a first detector on the frame for detecting whether the first sorting member is located at the first sorting position, the second sorting position, or the third sorting position, and the detection assembly further comprises a second detector on the frame for detecting whether the second sorting member is located at the first sorting position, the second sorting position, or the third sorting position;

wherein the first detector comprises a first proximity sensor and a second proximity sensor; the second detector comprises a third proximity sensor and a fourth proximity sensor; the first sorting member is provided with a first sensing plate and a second sensing plate, and the first proximity sensor and the second proximity sensor are located on the movement trajectory of the first sensing plate and the second sensing plate; the second sorting member is provided with a third sensing plate and a fourth sensing plate, and the third proximity sensor and the fourth proximity sensor are located on the movement trajectory of the third sensing plate and the fourth sensing plate; in an initial state, the first sensing plate is opposite to the first proximity sensor, the second sensing plate is opposite to the second proximity sensor, the third sensing plate is opposite to the third proximity sensor, and the fourth sensing plate is opposite to the fourth proximity sensor.

2. The beverage bottle sorting mechanism according to claim 1, wherein the first sorting member comprises a first rotating shaft and a first sorting guide plate, the second sorting member comprises a second rotating shaft and a second sorting guide plate, the first rotating shaft and the second rotating shaft are spaced apart and rotatably mounted in the frame, the first sorting guide plate is fixedly connected to the first rotating shaft, and the second sorting guide plate is fixedly connected to the second rotating shaft; the first rotating shaft and the second rotating shaft are connected to the driving member by transmission.

3. The beverage bottle sorting mechanism according to claim 2, wherein an access door is provided on an inlet side of the first sorting guide plate on the surface opposite to the second sorting guide plate; or an access door is provided on an inlet side of the second sorting guide plate on the surface opposite to the first sorting guide plate.

4. The beverage bottle sorting mechanism according to claim 3, wherein when the access door is provided on the first sorting guide plate, a reinforcing plate is connected between the first rotating shaft and the side of the access door near the second sorting guide plate; or when the access door is provided on the second sorting guide plate, a reinforcing plate is connected between the second rotating shaft and the side of the access door near the first sorting guide plate.

5. A sorting and recycling device, comprising a recognition chamber, three recycling bins, and a conveying mechanism, wherein the conveying mechanism is arranged in the recognition chamber, the sorting and recycling device further comprises the beverage bottle sorting mechanism according to claim 4, an infeed side of the beverage bottle sorting mechanism is connected to an outlet side of the conveying mechanism, and a discharge side of the beverage bottle sorting mechanism is connected to the three recycling bins.

6. A sorting and recycling device, comprising a recognition chamber, three recycling bins, and a conveying mechanism, wherein the conveying mechanism is arranged in the recognition chamber, the sorting and recycling device further comprises the beverage bottle sorting mechanism according to claim 3, an infeed side of the beverage bottle sorting mechanism is connected to an outlet side of the conveying mechanism, and a discharge side of the beverage bottle sorting mechanism is connected to the three recycling bins.

7. The beverage bottle sorting mechanism according to claim 2, wherein a first directing plate inclined downwards is provided at the bottom of the first sorting guide plate on the side away from the second sorting guide plate; and a second directing plate inclined downwards is provided at the bottom of the side of the second sorting guide plate on the side away from the first sorting guide plate.

8. A sorting and recycling device, comprising a recognition chamber, three recycling bins, and a conveying mechanism, wherein the conveying mechanism is arranged in the recognition chamber, the sorting and recycling device further comprises the beverage bottle sorting mechanism according to claim 7, an infeed side of the beverage bottle sorting mechanism is connected to an outlet side of the conveying mechanism, and a discharge side of the beverage bottle sorting mechanism is connected to the three recycling bins.

9. The beverage bottle sorting mechanism according to claim 2, wherein the frame comprises a mounting plate, the bottom surface of the mounting plate is rotatably mounted with the first rotating shaft and the second rotating shaft, and the top surface of the mounting plate is mounted with the driving member; the driving member comprises a first driving motor and a second driving motor, the first driving motor is connected to the first rotating shaft by transmission, and the second driving motor is connected to the second rotating shaft by transmission.

10. A sorting and recycling device, comprising a recognition chamber, three recycling bins, and a conveying mechanism, wherein the conveying mechanism is arranged in the recognition chamber, the sorting and recycling device further comprises the beverage bottle sorting mechanism according to claim 9, an infeed side of the beverage bottle sorting mechanism is connected to an outlet side of the conveying mechanism, and a discharge side of the beverage bottle sorting mechanism is connected to the three recycling bins.

11. A sorting and recycling device, comprising a recognition chamber, three recycling bins, and a conveying mechanism, wherein the conveying mechanism is arranged in the recognition chamber, the sorting and recycling device further comprises the beverage bottle sorting mechanism according to claim 2, an infeed side of the beverage bottle sorting mechanism is connected to an outlet side of the conveying mechanism, and a discharge side of the beverage bottle sorting mechanism is connected to the three recycling bins.

12. The beverage bottle sorting mechanism according to claim 1, wherein the first detector comprises the first proximity sensor, the second proximity sensor, and a fifth proximity sensor; the second detector comprises the third proximity sensor, the fourth proximity sensor, and a sixth proximity sensor; the first sorting member is provided with the first sensing plate, and the second sorting member is provided with the third sensing plate; the first proximity sensor, the second proximity sensor, and the fifth proximity sensor are arranged on the movement trajectory of the first sensing plate; and the third proximity sensor, the fourth proximity sensor, and the sixth proximity sensor are arranged on the movement trajectory of the third sensing plate.

13. A sorting and recycling device, comprising a recognition chamber, three recycling bins, and a conveying mechanism, wherein the conveying mechanism is arranged in the recognition chamber, the sorting and recycling device further comprises the beverage bottle sorting mechanism according to claim 12, an infeed side of the beverage bottle sorting mechanism is connected to an outlet side of the conveying mechanism, and a discharge side of the beverage bottle sorting mechanism is connected to the three recycling bins.

14. A sorting and recycling device, comprising a recognition chamber, three recycling bins, and a conveying mechanism, wherein the conveying mechanism is arranged in the recognition chamber, the sorting and recycling device further comprises the beverage bottle sorting mechanism according to claim 1, an infeed side of the beverage bottle sorting mechanism is connected to an outlet side of the conveying mechanism, and a discharge side of the beverage bottle sorting mechanism is connected to the three recycling bins.

* * * * *